United States Patent [19]
Shisler et al.

[11] 4,436,242
[45] Mar. 13, 1984

[54] DESOLDERING TOOL AND METHOD OF DESOLDERING LEADLESS COMPONENTS

[75] Inventors: Robert W. Shisler, Noblesville; Ronald E. McVety, Indianapolis, both of Ind.

[73] Assignee: RCA Corporation, New York, N.Y.

[21] Appl. No.: 331,088

[22] Filed: Dec. 15, 1981

[51] Int. Cl.³ .................. B23K 3/02; H05K 13/00
[52] U.S. Cl. .................................. 228/264; 228/19
[58] Field of Search .............. 228/6 A, 44.1 A, 19, 228/20, 264

[56] References Cited

U.S. PATENT DOCUMENTS

| | | | |
|---|---|---|---|
| 3,448,911 | 6/1969 | Cushman | 228/44.1 A |
| 3,649,809 | 3/1972 | Halstead | 219/228 |
| 3,700,155 | 10/1972 | Hermanns | 228/4.1 X |
| 3,813,023 | 5/1974 | Auray et al. | 228/19 |
| 3,815,806 | 6/1974 | Paxton | 228/19 |
| 4,066,204 | 1/1978 | Wirbser et al. | 228/264 |

OTHER PUBLICATIONS

Drexinger, "Repair of Integrated Circuits" *Western Electric Technical Digest*, No. 3, Jul. 1966, p. 11.

*Primary Examiner*—Kenneth J. Ramsey
*Attorney, Agent, or Firm*—Joseph S. Tripoli; Robert L. Troike; William Squire

[57] ABSTRACT

A desoldering tip, adapted to be attached to a standard pencil soldering iron, is formed with a recess adapted to closely fit over a leadless component soldered and adhered with an adhesive to a printed circuit board. Solder present in the recess attaches the component to the tool by molecular attraction. Once the solder and adhesive are melted, the component is readily lifted from the board with the tool. The component is then ejected from the tool.

15 Claims, 4 Drawing Figures

DESOLDERING TOOL AND METHOD OF DESOLDERING LEADLESS COMPONENTS

The present invention relates to desoldering tools and, in particular, to tools for removing leadless components from a printed circuit board.

A leadless component is a device which, by way of example, may be rectangular in shape with terminals at opposite ends of the device. Such a component is secured to a printed circuit board with an adhesive, with its terminals over respective conductors on the board. After the component is in place, its terminals are soldered to the conductors.

Occasionally, it is necessary to remove a leadless component from the board on which it is mounted. This requires that both the solder and the adhesive be melted, and then the component is lifted off the board. It is known in the art to effect the removal by employing a tool which has a heating element for melting the solder. The tool may also include either a blower for blowing the solder from the connection or a vacuum means for attaching the component to the tool and for sucking the solder from the connection. The component then may be removed manually by lifting the tool with the suction attached, with a tweezers, or with lifting fingers on the tool. The blower method is not entirely satisfactory as the solder may be displaced to other areas of the board. Also, the heating elements in many of these tools do not always do a sufficiently good job of melting the adhesive.

Another known method for removing leadless components involves the use of a hot knife. The hot blade of the knife melts both the solder and the adhesive holding the component in place. A disadvantage of this approach is that there may be insufficient room for the blade, especially when the leadless components are secured side by side closely adjacent to one another. Another is that the hot blade sometimes can char or burn the printed circuit board.

In accordance with the present invention, a component desoldering tool comprises a shaft having a hollow core, means for heating the shaft, and a desoldering tip secured to the shaft in the shaft core. The tip and shaft are thermally conductive and in thermally conductive contact. A projection is on the extended end of the tip. The projection has a recess, the recess having a perimeter of a given geometrical shape adapted to match the shape of the component to be desoldered and slightly larger than the dimensions of the component so that the component can closely fit into the recess. The recess has a base such that when the component is within the recess the surface of the component closest from the base is spaced a relatively small distance from the base. When the projection recess is wetted with solder, molecular attraction of the solder to the component in the recess permits the tool to lift the component from a printed circuit board.

Figure 1:
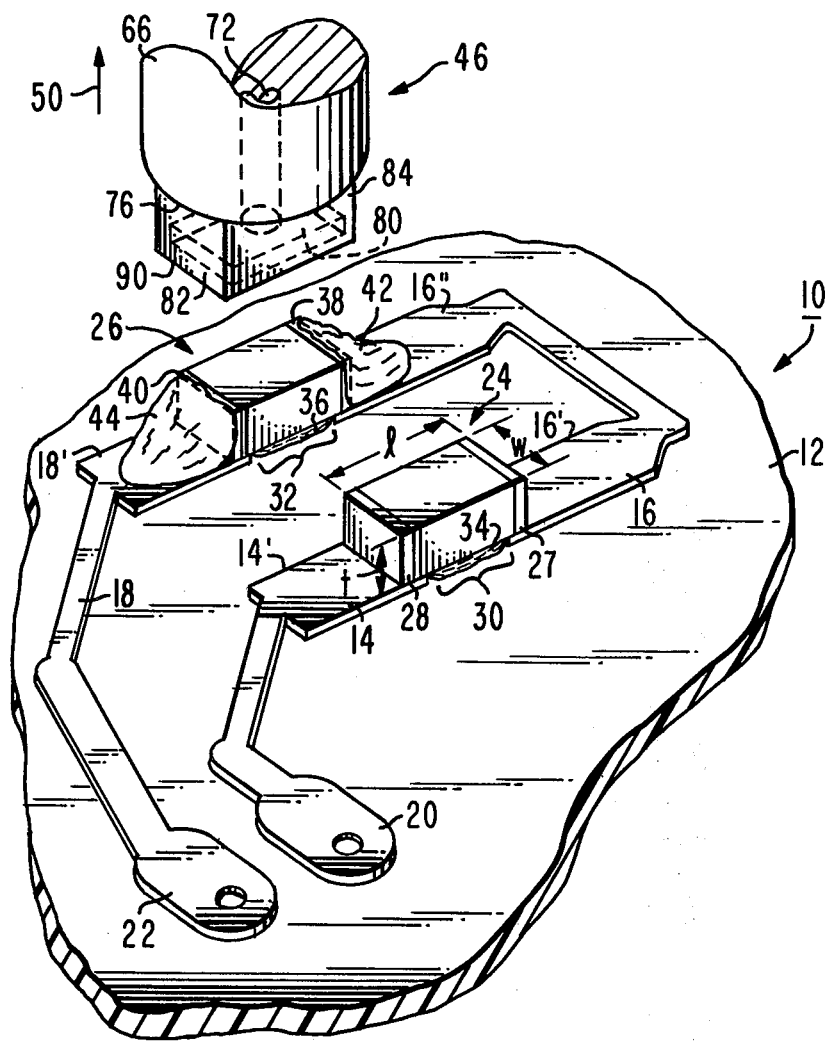
FIG. 1 is an isometric view of a portion of a printed circuit board including a leadless component to be removed and a desoldering tool embodying the present invention.

In FIG. 1 a printed circuit board 10 includes an insulating substrate 12 and printed conductors 14, 16, and 18 on a surface of the substrate 12. Conductor 14 includes a pad 14' which is connected to pad 20. Conductor 16 includes a pad 16' which is connected to pad 16". Conductor 18 includes a pad 18' connected to pad 22.

Leadless components 24 and 26, which, in this embodiment, are rectangular in shape, are secured to the circuit board 10. Component 24 includes a conductive terminal 27 at one end and a second conductive terminal 28 at the other end. Component 26 is similar in construction. Components 24 and 26 are made of a ceramic material and may form resistances or capacitors and are of known construction. Each component has a length dimension l, a width dimension w, and a thickness dimension t.

The pad 14' is spaced from the pad 16' by a gap 30. Similarly, the pad 16" is spaced from the pad 18' by a gap 32. The components 24 and 26 are respectively secured to the surface of the substrate 12 by adhesive 34 and 36, respectively. The terminal 27 is above and rests on pad 16' and the terminal 28 rests on pad 14'. Terminals 38 and 40 of component 26 rest on the respective pads 16" and 18'.

Component 26 is shown soldered and component 24 prior to soldering. Terminal 38 of component 26 is soldered to the pad 16" with a globular mass of solder 42. The terminal 40 is soldered to the pad 18' by mass of solder 44.

Occasionally, one or more of the soldered components such as component 26 needs to be removed from the substrate 12 and disconnected from the corresponding conductors 16 and 18. Tool 46 removes leadless components, such as component 26, from the board 10. The tool 46, to be described, applies heat to the component body and terminals sufficient to melt the adhesive 36 and also melt the solder 42 and 44. As will be described, solder in the tool provides attraction forces which adhere the component, such as component 26, to the tool 46 when the tool is moved in direction 50. The component, such as component 26, is also moved in the direction 50 lifting the component from the board 10. No fingers, tweezers, or other mechanical gripping devices are required between the tool 46 and the component 26 to lift the component 26 from the board 10 after the adhesive 36 and the solder 42 and 44 are melted.

Figure 2:
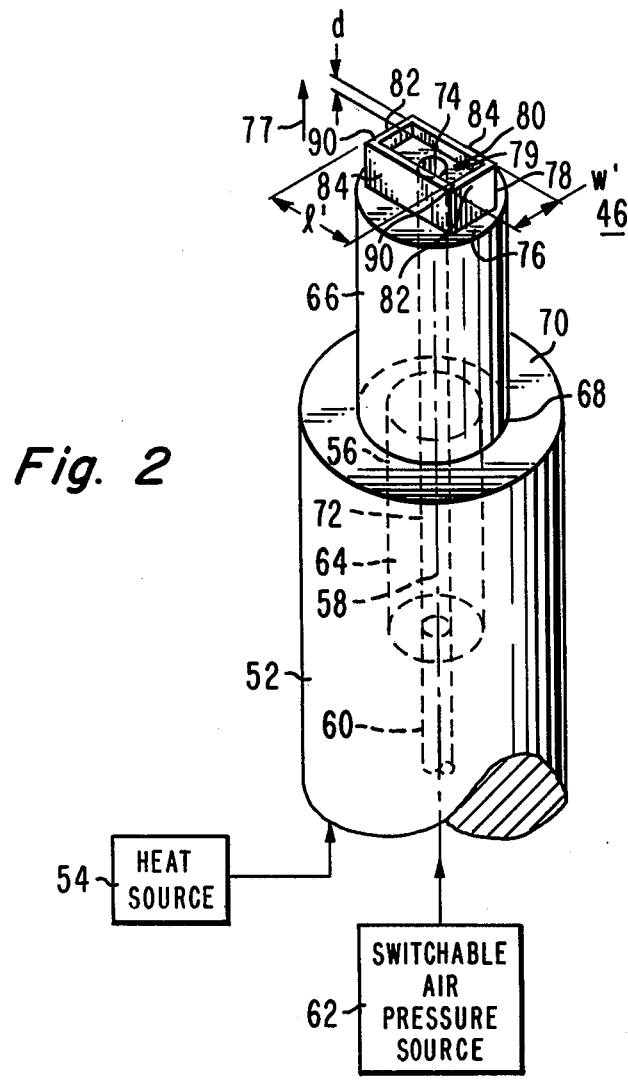
FIG. 2 is an isometric view of the tool tip embodying the present invention.
Figure 3:
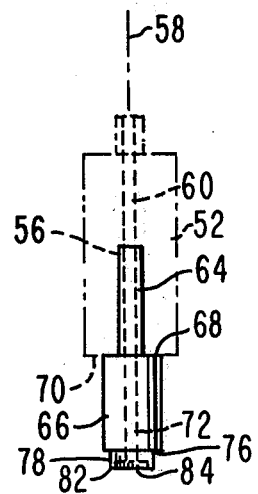
FIG. 3 is a side elevation view of the desoldering tip of FIG. 2.

In FIGS. 2 and 3, tool 46 is adapted to be secured to a pencil soldering iron shaft 52 and may be made of any suitable material employed in soldering tool tips, for example, brass. The shaft 52 is attached to a conventional heating mechanism in a pencil soldering iron which, by electrical energy applied through a resistance element, heats the shaft 52 to the desired temperature. The resistance element and its associated circuitry for heating the shaft 52 is represented by the heat source 54. The soldering iron tool also includes a handle, not illustrated.

The soldering iron shaft 52 has a hollow circular cylindrical opening 56. The opening is centered about the long axis 58 of shaft 52. The shaft 52 includes a conduit 60 which couples opening 56 to an air pressure source 62. The air pressure in conduit 60 is switchable, that is, it can be selectively turned on and off by a manual switch (not shown). For example, the air pressure source may be an air pressure compressor (not shown)

connected via an air pressure hose (not shown) and a valve (not shown) to the conduit 60. The valve may be manually opened and closed momentarily to create an air pulse.

Tool 46 includes a cylindrical shank 64 and a cylindrical body 66 at one end of the shank 64. While the shank 64 and the body 66 are of circular cross-section, they could be other shapes. The body 66 in one embodiment is of larger diameter than the shank 64 so that the shoulder 68 of body 66 abuts the end face 70 of shaft 52. Shank 64 and shoulder 68 are both in thermal conductive contact with the shaft 52 so that there is heat transfer at their interface. For this reason the shank 64 is closely received within the opening 56 in shaft 52. Conduit 72 passes through the shank 64 and body 66. The conduit 72 is open to the ambient at its end 74. The end face 76 of body 66 may be a plane surface normal to the axis 58.

Secured to the end face 76 is a rectangular body 78. A rectangular recess 80 is formed by thin end walls 82 and longer thin side walls 84 extending from the body 78. The two end walls 82 are of like dimension and the two side walls 84 are of like dimensions and may all be of the same thickness. The base 79 of recess 80 is spaced from end face 76 in direction 77 and is a plane surface normal to axis 58. The depth d, the width w', and the length l' of the recess 80 are dimensions of special significance. The length l', depth d, and width w' of the recess 80 have a predetermined relationship to the width w, thickness t, and length l of the leadless component such as component 24, FIG. 1. The length l' and width w' should be about 0.01 inch greater than the length l and width w, respectively, of a leadless component. The depth dimension d should be about 0.015 inch greater than the thickness dimension t of the component.

In operation, the walls 82, 84 and base 79 of opening 80, all at the tip of the tool, first are wetted with solder. The opening 80, FIG. 2, formed by walls 82, 84 is then placed over a component such as component 26, FIG. 1. The edges of walls 82 abut the solder 42 and 44 with the component 26 centered in the recess 80. The tool 46 is gently pushed against the component (in the direction opposite direction 50) either by hand or by machine (not shown) while heat is being applied. The heat from the tool 46 at walls 82, 84 is conductively transferred to the solder 42 and 44, melting the solder. As the solder melts, the force being applied to the tool forces it in a downward direction (in a direction opposite direction 50.)

Eventually, the edges 90 of walls 82 have passed through the now molten solder and abut the conductor pads 18' and 16''. The component 26 is, at this point, fully within opening 80. The end face 76 is spaced above the level of the next adjacent component 24 as face 76 is spaced from the base 79. At this point some of the solder 42 and 44 may remain within the opening 80 in the spaces between the component 26 and the walls 82 of the tool 46. This solder in addition to the solder on the pre-wetted tip, by capillary action, may flow into the very narrow spaces between the component 26 and the inner surfaces of the opening 80. The solder in these spaces releasably holds the component 26 to the inner surfaces of the walls 82 and 84 and to the base 79 of the opening 80. It is believed this adherence may be due to the molecular attraction between the liquid solder and the component. It may also be due to the liquid solder filling the spaces between the component and tool. Any attempt to separate the two may create a vacuum in that space. Atmospheric pressure thus tends to keep the component attached to the tool.

At this time the base 79 surface of the opening 80 is closely spaced to the component surface the approximate 0.015 inch dimension mentioned previously. This dimension is sufficient to permit almost no temperature gradient to be present between the tip 46 and the component 26. That is, the component 26 being fully surrounded by the walls 82, 84 and base 79, conductively and possibly also radiantly receives the heat from these elements so that eventually the component 26 is raised to the temperature of the tip 46 with almost no temperature gradient between the two. The elevated temperature of the component 26 is transferred eventually to the component surface adjacent adhesive 36, melting the adhesive 36 by conductive heat transfer. The solder 42, 44 being previously melted, remains in the molten condition by the thermal coupling with the tool 46. The component 26 is adherently attached to the tool 46 in the recess 80 by the molecular attractive forces of the solder at the interfaces between component 26 and the tool 46 surfaces. The tool may then be twisted slightly about axis 58, FIG. 2, to help free the component 26 from the board. Raising the tool 46 in the direction 50 lifts the component 26 from the printed circuit board. Subsequently, the air pressure from source 62, FIG. 2, is switched on and off creating a pulse of air, under pressure, which is applied through the conduit 60 to the conduit 72 in the tool 46. The air emerges from the end 74 of the conduit 72 as a high velocity pulse which ejects the component 26, FIG. 1, from the recess 80.

The relative thinness of the walls 82, 84 permits the tool 46, FIG. 1, walls 84 to be placed between two adjacent components such as components 24 and 26, FIG. 1. For example, the walls may have a thickness less than the spacing between components 24 and 26 which may be about 1/32 inch.

By way of example, a tool 46 constructed in accordance with the present invention may have an overall length in a direction parallel to axis 58, FIG. 2, of 0.875 inch where the body 66 has a length of 0.375 inch in that direction. The length dimension l', FIG. 2, for the recess 80 is about 0.136 inch and the width w' is about 0.075 inch. The depth d of the opening 80 is about 0.035 inch. Conduit 72 is about 0.040 inch in diameter. In some implementations the base of the opening 80 may be spaced from the end face 76 of body 66 by 1/16 inch. The corresponding mating component such as component 26 has length, width, and thickness dimensions relative to that of the opening 80 as described above. That is, the component has a length and width which are 0.010 inch smaller than the corresponding length and width dimensions of opening 80 and a thickness which is about 0.015 inch smaller than the depth of the opening 80.

It is important that when the tool 46 is placed in contact with a printed circuit board over a component 26 that the axis 58, FIG. 2, is perpendicular to the surface of the substrate 12, FIG. 1. This insures uniform spacing of the tool opening 80 walls from the component.

One type of pencil soldering iron that may be used with the tool 46 may be a Weller WTCPN series apparatus. This apparatus has a low-voltage, temperature-controlled soldering pencil. The maximum tip temperature is controlled. The tip is electrically grounded. The tool includes a stainless steel heater and a selection of iron-plated tips ranging in sizes from 1/32 inch diameter to 15/64 inch diameter with a choice of tip temperatures of 600°, 700°, and 800° F. The unit has as a power input of 60 watts and a transformer output voltage of 24 volts. The power wattage of the soldering pencil is 48 watts. The tip exhibits a voltage to system ground of less than 2 millivolts. The Weller tool is modified to include the conduit 60 and means for coupling the conduit 60 to the air pressure source 62, FIG. 2. In using the Weller soldering pencil described above, the tool 46 tip should contact the printed circuit board for no more than about three seconds. This is to prevent scorching of the printed circuit board substrate 12. A slight 5° to 15° twist of the soldering iron with the tool 46 attached after the solder softens, also aids the capture of the chip in the tool 46. It is not, however, desirable to twist the tip excessively or to wipe the tip across the printed circuit board substrate as this may damage the board or conductors. It should be understood that the walls 82, 84 and the base 79 of the opening 80, FIG. 2, are prewetted with sufficient solder prior to employing the tip for removing and desoldering a printed circuit board component to insure good attraction and good heat transfer between the tool and the component.

Figure 4:
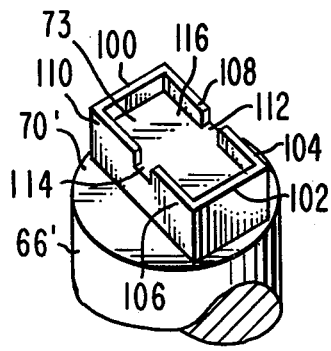
FIG. 4 is an isometric view of an alternate embodiment of a tip according to the present invention.

An alternate tip construction is shown in FIG. 4 wherein the tip includes body 66' which may be identical to the body 66, FIG. 2. Not shown in FIG. 4 but also included is a shaft, such as shaft 64, FIGS. 2 and 3. Attached to the end face 70' of body 66' are the following elements. Two end walls 100, 102 of relatively thin material and preferably machined from the same material as the body 66' and which may be approximately 1/32 inch thick each, face each other on diametrically opposite sides of the center of the body 66' end face. Two legs 104 and 106 of about the thickness as the wall 102 are parallel to each other forming a U with the wall 102. Two walls 108 and 110 are attached to the other wall 100 forming a second U and are mounted on edge to the face 70' as shown. The walls 104 and 108 face each other as do the walls 106 and 110 forming gaps 112 and 114 therebetween. The gaps 112 and 114 permit a component ejection tool (not shown) to be inserted in the gaps 112 or 114 into the opening 116 formed by the walls. The ejection tool in use is inserted between the component and the base 73 of opening 116. The component (not shown in FIG. 4) is pried free and ejected from the opening 116. In this case there is no conduit in the member 66' corresponding to the conduit 72 in member 56, FIGS. 2 and 3. Other eject configurations may be used depending on the implementation.

While the present tool 46, FIG. 2, has been shown and described with respect to a hand pencil soldering tool, it should be apparent that the tool 46 may be employed with automatic desoldering equipment.

What is claimed is:

1. A desoldering tool tip for removing leadless components having a given geometrical perimeter from a printed circuit board, said tip being adapted to be employed with a soldering iron tool having a heated portion containing a recess for receiving said tip, said tip comprising:
   a shank portion adapted to be received in said recess;
   a tip portion at the end of the shank portion, both portions being thermally conductive, said tip portion including a perimeter wall and base which together define a recess, the recess having a shape such that the component can closely fit within it, with a relatively small spacing between the perimeter of the component and the inner surfaces of the perimeter wall and between the base of the recess and adjacent surface of the component, said spacing being sufficiently small to permit transfer of heat from said tip to said component with a negligible temperature gradient between said component and said tip and also to provide molecular attraction forces between said tip and said component when molten solder is present in the space between the inner surfaces of the perimeter wall and base of the recess, and the component; and
   a coating of solder on said perimeter wall and base within said recess to provide said molecular attraction forces.

2. The tip of claim 1 wherein said tip has air passage means for receiving pressurized air, said passage means including a conduit in communication with said base of said recess.

3. The tip of claim 1 wherein the perimeter of said component is rectangular, wherein said tip portion includes a circular cylindrical member having an end face, and wherein said perimeter wall is of rectangular shape and extends from said end face.

4. The tip of claim 1 wherein said component is a solid rectangle having a thickness, width, and length, wherein said base of said recess has a width and length slightly greater than said width and length, respectively, of said component, and wherein the depth of said recess is slightly greater than said thickness of said component.

5. The tip of claim 1 wherein said tip recess perimeter has a width and length dimension and has a uniform depth dimension, each said dimension corresponding to a dimension of said component, each said tip recess width and length dimension being greater than the corresponding component dimension by about 0.010 inch, said tip recess depth dimension being greater than said component thickness by about 0.015 inch.

6. A component desoldering tool comprising:
   a shaft having a hollow core;
   means for heating said shaft;
   a desoldering tip secured to said shaft in said core, said tip and shaft being thermally conductive and in thermally conductive contact;
   a projection on the extended end of said tip, said projection having a recess, the recess having a perimeter of a given geometrical shape matching the shape of the component to be desoldered and slightly larger than the dimensions of said component so that the component can closely fit into the recess, and, said recess having a base at a depth such that when the component is within the recess, the surface of said component closest from the base is spaced a relatively small distance from the base, and
   a layer of solder on said perimeter and base within said recess to provide molecular attraction forces on said component when in said recess.

7. The tool of claim 6 wherein said given geometrical shape is rectangular, and is defined by four relatively thin walls.

8. The tool of claim 6 wherein the recess perimeter includes a continuous rectangular wall.

9. The tool of claim 6 wherein the recess perimeter includes a discontinuous rectangular wall, the discontinuity extending to said base and serving as an opening into which a tool can be inserted for removing a component which has been desoldered and is within the recess.

10. A leadless component desoldering tool tip comprising:
- a shaft having an end face;
- a rod-like member having first and second faces at its respective opposite ends, said member being heat conductively and mechanically fixed at its first face to said end face of said shaft;
- a rectangular member attached to said second face of said member, the rectangular member comprising side walls which define a recess of given shape, and having also a planar base normal to said side walls defining the base of said recess, and
- a layer of solder on said side walls and base within said recess to provide molecular attraction forces on said component when in said recess.

11. The tip of claim 10 wherein said side walls are discontinuous to permit the insertion in the discontinuity of a tool for removing from the recess a component that may be present therein.

12. The tip of claim 10 further including conduit means opening at said base through which pressurized air may be supplied to said recess for removing therefrom a component which may be present therein.

13. A leadless component desoldering tool tip comprising:
- a shaft having an end face;
- a rod-like member having first and second faces at its respective opposite ends, said member being heat conductively and mechanically fixed at its first face to said end face of said shaft; and
- a rectangular member attached to said second face of said member, the rectangular member comprising side walls which define a recess of given shape, and having also a planar base normal to said side walls defining the base of said recess, said side walls being discontinuous to permit the insertion in the discontinuity of a tool for removing from the recess a component that may be present therein.

14. A component desoldering tool comprising:
- a shaft having a hollow core;
- means for heating said shaft;
- a desoldering tip secured to said shaft in said core, said tip and shaft being thermally conductive and in thermally conductive contact; and
- a projection on the extended end of said tip, said projection having a recess, the recess having a perimeter of a given geometrical shape matching the shape of the component to be desoldered and slightly larger than the dimensions of said component so that the component can closely fit into the recess, and, said recess having a base at a depth such that when the component is within the recess, the surface of said component closest from the base is spaced a relatively small distance from the base, the recess perimeter including a discontinuous rectangular wall, the discontinuity extending to said base and serving as an opening into which a tool can be inserted for removing a component which has been desoldered and is within the recess.

15. A method of removing a leadless component from a printed circuit board comprising:
- coating the recess of a recessed desoldering tip with solder;
- heating said tip and solder until the solder is molten;
- applying the tip to said component to provide sufficiently close engagement between said molten solder and component to create molecular attraction forces therebetween and sufficient heat transfer from said tip to said component to loosen said component from said board; and
- displacing said tip relative to said printed circuit board to remove said loosened component from said board.

* * * * *